United States Patent [19]

Benner

[11] Patent Number: 5,111,534
[45] Date of Patent: May 5, 1992

[54] METHOD FOR ASSIGNING TELECOMMUNICATIONS CHANNELS IN A CELLULAR TELEPHONE SYSTEM

[75] Inventor: Frank D. Benner, Calgary, Canada

[73] Assignee: Telus Corporation, Edmonton, Canada

[21] Appl. No.: 576,744

[22] Filed: Sep. 4, 1990

[30] Foreign Application Priority Data

Aug. 10, 1990 [CA] Canada .................. 2023053

[51] Int. Cl.⁵ .................. H04B 7/26; H04Q 7/02
[52] U.S. Cl. .................. 455/33.2; 379/59; 455/34.1
[58] Field of Search .......... 455/33, 34, 53, 54, 455/56; 379/59, 60

[56] References Cited

U.S. PATENT DOCUMENTS

| | | |
|---|---|---|
| 4,128,740 | 12/1978 | Graziano . |
| 4,144,411 | 3/1979 | Frenkiel . |
| 4,144,496 | 3/1979 | Cunningham . |
| 4,249,181 | 2/1981 | Lee . |
| 4,355,411 | 10/1982 | Reudink et al. . |
| 4,726,050 | 2/1988 | Menich et al. . |
| 4,730,187 | 3/1988 | Menich et al. . |
| 4,775,998 | 10/1988 | Felix . |
| 4,797,947 | 1/1989 | Labedz . |
| 4,914,651 | 4/1990 | Lusignan .......... 370/69.1 |
| 4,932,049 | 6/1990 | Lee . |

FOREIGN PATENT DOCUMENTS

| | | |
|---|---|---|
| 297062A | 12/1988 | European Pat. Off. . |
| 2438389 | 6/1980 | France .................. 455/33 |
| 0054725 | 3/1986 | Japan .................. 455/33 |
| 2220326 | 1/1990 | United Kingdom .......... 455/33 |

OTHER PUBLICATIONS

"Cellular Mobile Radiotelephones" by Stephen W. Gibson, Prentice-Hall, Inc., pp. 22, 41-45, 63-64, 85, 122, 133, 135-136 and 141, published 1987.
IEEE Trans. on Veh. Tech., Nomura et al., Aug. 1976.

*Primary Examiner*—Reinhard J. Eisenzopf
*Assistant Examiner*—Chi H. Pham
*Attorney, Agent, or Firm*—Skjerven, Morrill, MacPherson, Franklin & Friel

[57] ABSTRACT

A method of assigning frequencies in a cellular telephone system in which a first group of the available frequencies is assigned to a first cell, and then distinct groups are assigned to adjacent cells, leaving at least one distinct group of frequencies free for later re-use. This system is applied to each cell in the system, so that for any cell, it and its adjacent cells do not use all of the frequencies in the system. For a first stage of cell splitting, frequencies are assigned from at least one non-adjacent cell (using the frequency re-use groups) to at least one part of the cell being split, while maintaining coverage of the cell from the same cell site. In a further stage of cell splitting in which there are adjacent first and second sets of three co-located end radiated cells, each radiated by directional antennas at first and second cell sites respectively, the cells are split by: locating a third cell site at about the mid-day point between the first and second cell sites; and radiating at least a third cell from the third cell site. An example is given based on 9 cells with sites arranged for end radiation of 3 cells from one site, thus reducing the number of cell sites. At each site the 3 co-located cells use frequency groups spaced to give protection against adjacent channel interference. The use of end radiated cells allows for less co-channel interference, as well as providing for a more distinct handoff between cells.

18 Claims, 9 Drawing Sheets

| 1A | 2A | 3A | 4A | 5A | 6A | 7A | 1B | 2B | 3B | 4B | 5B | 6B | 7B | 1C | 2C | 3C | 4C | 5C | 6C | 7C |
|----|----|----|----|----|----|----|----|----|----|----|----|----|----|----|----|----|----|----|----|----|
| *334 | 335 | 336 | 337 | 338 | 339 | 340 | 341 | 342 | 343 | 344 | 345 | 346 | 347 | 348 | 349 | 350 | 351 | 352 | 353 | 354 |
| 355 | 356 | 357 | 358 | 359 | 360 | 361 | 362 | 363 | 364 | 365 | 366 | 367 | 368 | 369 | 370 | 371 | 372 | 373 | 374 | 375 |
| 376 | 377 | 378 | 379 | 380 | 381 | 382 | 383 | 384 | 385 | 386 | 387 | 388 | 389 | 390 | 391 | 392 | 393 | 394 | 395 | 396 |
| 397 | 398 | 399 | 400 | 401 | 402 | 403 | 404 | 405 | 406 | 407 | 408 | 409 | 410 | 411 | 412 | 413 | 414 | 415 | 416 | 417 |
| 418 | 419 | 420 | 421 | 422 | 423 | 424 | 425 | 426 | 427 | 428 | 429 | 430 | 431 | 432 | 433 | 434 | 435 | 436 | 437 | 438 |
| 439 | 440 | 441 | 442 | 443 | 444 | 445 | 446 | 447 | 448 | 449 | 450 | 451 | 452 | 453 | 454 | 455 | 456 | 457 | 458 | 459 |
| 460 | 461 | 462 | 463 | 464 | 465 | 466 | 467 | 468 | 469 | 470 | 471 | 472 | 473 | 474 | 475 | 476 | 477 | 478 | 479 | 480 |
| 481 | 482 | 483 | 484 | 485 | 486 | 487 | 488 | 489 | 490 | 491 | 492 | 493 | 494 | 495 | 496 | 497 | 498 | 499 | 500 | 501 |
| 502 | 503 | 504 | 505 | 506 | 507 | 508 | 509 | 510 | 511 | 512 | 513 | 514 | 515 | 516 | 517 | 518 | 519 | 520 | 521 | 522 |
| 523 | 524 | 525 | 526 | 527 | 528 | 529 | 530 | 531 | 532 | 533 | 534 | 535 | 536 | 537 | 538 | 539 | 540 | 541 | 542 | 543 |
| 544 | 545 | 546 | 547 | 548 | 549 | 550 | 551 | 552 | 553 | 554 | 555 | 556 | 557 | 558 | 559 | 560 | 561 | 562 | 563 | 564 |
| 565 | 566 | 567 | 568 | 569 | 570 | 571 | 572 | 573 | 574 | 575 | 576 | 577 | 578 | 579 | 580 | 581 | 582 | 583 | 584 | 585 |
| 586 | 587 | 588 | 589 | 590 | 591 | 592 | 593 | 594 | 595 | 596 | 597 | 598 | 599 | 600 | 601 | 602 | 603 | 604 | 605 | 606 |
| 607 | 608 | 609 | 610 | 611 | 612 | 613 | 614 | 615 | 616 | 617 | 618 | 619 | 620 | 621 | 622 | 623 | 624 | 625 | 626 | 627 |
| 628 | 629 | 630 | 631 | 632 | 633 | 634 | 635 | 636 | 637 | 638 | 639 | 640 | 641 | 642 | 643 | 644 | 645 | 646 | 647 | 648 |
| 649 | 650 | 651 | 652 | 653 | 654 | 655 | 656 | 657 | 658 | 659 | 660 | 661 | 662 | 663 | 664 | 665 | 666 | | | |

FIGURE 2
PRIOR ART

| 1 | 2 | 3 | 4 | 5 | 6 | 7 | 8 | 9 | 10 | 11 | 12 | 13 | 14 | 15 | 16 | 17 | 18 | WC 19 | WC 20 | WC 21 |
|---|---|---|---|---|---|---|---|---|----|----|----|----|----|----|----|----|----|-------|-------|-------|
| *334 | 335 | 336 | 337 | 338 | 339 | 340 | 341 | 342 | 343 | 344 | 345 | 346 | 347 | 348 | 349 | 350 | 351 | 352 | 353 | 354 |
| 355 | 356 | 357 | 358 | 359 | 360 | 361 | 362 | 363 | 364 | 365 | 366 | 367 | 368 | 369 | 370 | 371 | 372 | 373 | 374 | 375 |
| 376 | 377 | 378 | 379 | 380 | 381 | 382 | 383 | 384 | 385 | 386 | 387 | 388 | 389 | 390 | 391 | 392 | 393 | 394 | 395 | 396 |
| 397 | 398 | 399 | 400 | 401 | 402 | 403 | 404 | 405 | 406 | 407 | 408 | 409 | 410 | 411 | 412 | 413 | 414 | 415 | 416 | 417 |
| 418 | 419 | 420 | 421 | 422 | 423 | 424 | 425 | 426 | 427 | 428 | 429 | 430 | 431 | 432 | 433 | 434 | 435 | 436 | 437 | 438 |
| 439 | 440 | 441 | 442 | 443 | 444 | 445 | 446 | 447 | 448 | 449 | 450 | 451 | 452 | 453 | 454 | 455 | 456 | 457 | 458 | 459 |
| 460 | 461 | 462 | 463 | 464 | 465 | 466 | 467 | 468 | 469 | 470 | 471 | 472 | 473 | 474 | 475 | 476 | 477 | 478 | 479 | 480 |
| 481 | 482 | 483 | 484 | 485 | 486 | 487 | 488 | 489 | 490 | 491 | 492 | 493 | 494 | 495 | 496 | 497 | 498 | 499 | 500 | 501 |
| 502 | 503 | 504 | 505 | 506 | 507 | 508 | 509 | 510 | 511 | 512 | 513 | 514 | 515 | 516 | 517 | 518 | 519 | 520 | 521 | 522 |
| 523 | 524 | 525 | 526 | 527 | 528 | 529 | 530 | 531 | 532 | 533 | 534 | 535 | 536 | 537 | 538 | 539 | 540 | 541 | 542 | 543 |
| 544 | 545 | 546 | 547 | 548 | 549 | 550 | 551 | 552 | 553 | 554 | 555 | 556 | 557 | 558 | 559 | 560 | 561 | 562 | 563 | 564 |
| 565 | 566 | 567 | 568 | 569 | 570 | 571 | 572 | 573 | 574 | 575 | 576 | 577 | 578 | 579 | 580 | 581 | 582 | 583 | 584 | 585 |
| 586 | 587 | 588 | 589 | 590 | 591 | 592 | 593 | 594 | 595 | 596 | 597 | 598 | 599 | 600 | 601 | 602 | 603 | 604 | 605 | 606 |
| 607 | 608 | 609 | 610 | 611 | 612 | 613 | 614 | 615 | 616 | 617 | 618 | 619 | 620 | 621 | 622 | 623 | 624 | 625 | 626 | 627 |
| 628 | 629 | 630 | 631 | 632 | 633 | 634 | 635 | 636 | 637 | 638 | 639 | 640 | 641 | 642 | 643 | 644 | 645 | 646 | 647 | 648 |
| 649 | 650 | 651 | 652 | 653 | 654 | 655 | 656 | 657 | 658 | 659 | 660 | 661 | 662 | 663 | 664 | 665 | 666 | | | |

METHOD FOR ASSIGNING TELECOMMUNICATIONS CHANNELS IN A CELLULAR TELEPHONE SYSTEM

FIELD OF THE INVENTION

This invention relates to a method for cell splitting and frequency assignment in a cellular telephone system, and to a distribution of frequency asignments in a cellular telecommunications system.

DESCRIPTION OF THE PRIOR ART

Although the concept of mobile telephones has been known for nearly as long as telephones have been known, it is only recently that mobile telephone systems have been used significantly by the general public. The recent increase in the use of mobile telephones has given rise to the present invention, which is used to accommodate a large number of customers (also known as subscribers or users) without an undue increase in the expense of providing the service. The difficulties that arise with an increase in the number of customers are as follows.

Mobile telephone systems use a separate frequency channel for each call from a mobile customer. The use of the same channel by another nearby customer may lead to interference on the channel and a reduction in service quality. This interference is known as co-channel interference.

It is therefore desirable to use as many channels as possible. Since there are only a set number of frequencies available, the frequencies must be assigned in groups to particular service areas. Each service area is known as a cell, from which the term "cellular system" is derived. Cells having the same group of frequencies are separated as much as possible to reduce co-channel interference.

Each cell is served by a cell site, at which the transmission and control equipment is located. Calls are routed to and from the cell site to a mobile telecommunications switching office and from there to the telephone network.

The equipment at each cell site includes an antenna, which may be either directional or omni-directional. An omni-directional antenna will typically be located at the center of a cell and radiate the entire cell. A directional antenna will typically be located at the corner of a cell and radiate the entire cell, known as end radiating the cell.

Cell shapes are determined by the radiation patterns of the antenna and the local conditions at the cell site. However, they may be idealized for analysis as a hexagonal pattern, since such a pattern closely approximates the ideal distribution of cell sites.

A useful introduction to this cellular system may be found in *Mobile Cellular Telecommunications Systems* by William C. Y. Lee, McGraw-Hill Book Company, New York, 1989, particularly chapters 1, 2 and 6, and in *The Bell System Technical Journal* Jan. 1979, No.1, Part 3, particularly pages 15–42.

In the AMPS system used in North America and several other parts of the world, the available 333 frequencies are divided among the cells so that there will be K different groups of frequencies divided among a repeated pattern of K cells. For the common case where K=7 there are about 45 frequencies for each cell.

The normal development of a cellular system in North America is to start with the 7 cell layout with up to 45 channels per cell. Each cell typically includes an omni-directional antenna radiating all of the cell from the mid-point of the cell. With large cells (12 Km radii) it is possible to assign the frequencies to the kth cell so that it includes all the frequencies defined by: $\{333+k+7j+21i\}$ for $i=0, 1, 2 \ldots 14$ and $j=0, 1$ and 2.

As the number of subscribers in a given area increases, frequency re-use is required in smaller and smaller areas. To accommodate this, cell splitting is required. Normally the first split is a 2:1 division of the cell radius (i.e. 4 times the number of cells). When this occurs, the interference from cells using the same frequency becomes a problem. To provide additional co-channel interference protection, the cells are sectorized or partitioned with sectors A, B and C. Each sector will now have up to 14 channels (Normally the 15th voice channel is dropped to accommodate the control and locate channels). Sectorization is accomplished by using directional antennas at about the mid-point of each cell and separate control channels per sector. Radiation patterns from the antennas would be as close as possible to provide end radiation of each sector.

The major problems with this method are:
1. Decreased trunking efficiency (refers to the statistical improvement of decreased blockage to phone calls as the number of channels are increased). The telephone traffic tables (see appendix 1.1 in Mobile Cellular Telecommunications Systems cited above) indicate approximately a 30% reduction per channel of traffic handling capability when the trunk group is changed from 44 to 14 channels. (Normally only 14 voice, control and locate channels are used per sector).
2. The high cost of cell division. This results from: (a) the necessity of obtaining many new sites; (b) additional signalling and paging channels; and (c) the increased number of voice channels resulting from decreased trunking efficiency.

In order to provide radio coverage to mobile cellular car phones and to allow frequency re-use, the cellular systems have been laid out with a frequency re-use based on K sub-groups (where K=4, 7, 9 or 12, see FIG. 2.3 of *Mobile Cellular Telecommunications Systems* cited above). The 666 frequencies of the primary frequency allocations have been allocated equally to the A & B bands. Normally the B Band has been assigned by the communication commission to the wireline companies and the A Band has been assigned to the Non-wireline companies.

The formula cited above gives the standard frequency layout (a chart is given at page 246 of *Mobile Cellular Telecommunications Systems* cited above). The first 21 channels are used for control channels and the remaining channels are used for voice channels. This allocation provides for 15 voice channels (the last 3 groups have only 14 voice channels) in each sub-group or 45 channels in the larger group (i.e. Group 1 consists of 15 voice channels in each sub-group 1A, 1B and 1C). The A subgroup corresponds to the $j=0$ frequencies in the formula cited above, the B sub-group to the $j=1$ frequencies and the C sub-group to the $j=2$ frequencies. Hence, all of the frequencies assigned to the sectors or parts of the cell were originally in the cell, and have simply been divided between the sectors or the cell.

Referring to FIG. 1A, there is shown a plurality of cells identified by a numeral from 1 to 7 in a conventional 7 cell pattern. Each cell is center radiated with an omni-directional antenna located about at its center. Channel assignment for each cell is made according to the table in FIG. 2, in which N=333 channels are divided into 21 groups, each with 3 sub-groups, or equivalently according to the formula: {333+k+7j+21i} for i=0, 1 2, ... 14 and j=0, 1 and 2, where k is the cell number, and j defines the sub-group number (0=A, 1 =B, 2=C). In the distribution shown, cells having the same k identification, hence having the same assigned frequencies, will be separated by a minimum two intervening cells, thus providing a measure of protection against co-channel interference, but in the cluster of cells adjacent to the K=1 cell, for example, all of the available frequencies are used.

FIG. 1B also shows a first stage of cell splitting of the conventional K=7 cell distribution. Thus, most of the cells have been shown with sectors A, B and C, to which are assigned the frequency subgroups as shown in FIG. 2. By this distribution, greater trunking efficiency is obtained, which results in a net re-use of frequency, and thus a greater degree of protection against co-channel interference may be obtained, than without sectoring.

This method of cell splitting requires that a directional antenna be used for each sector at each cell site. Normally the sectors have the same orientation, i.e. 1A is oriented in the same direction as 2A, 3A, 4A, etc.

A second stage of cell division is also shown in FIG. 1C in which the same frequency distribution is re-used on a smaller scale.

SUMMARY OF THE INVENTION

The invention described in this patent disclosure has been created by a new frequency allocation and by end radiating 3 cells from one cell site.

This procedure overcomes the major objections of the 7 cell sectorization. That is, the capacity of the system can be increased beyond the 7 cell sectored plan with ⅓ the number of cell sites. No loss in trunking efficiency occurs when directional antennas are required as the omni pattern is evolved into 3 directional cells as traffic dictates.

The co-channel interference is further minimized with the use of highly directional antennas and high gain antennas. Other methods that are known in the art may also be used. The adjacent channel interference from co-located cells is prevented by avoiding adjacent channels at a site.

Thus in one aspect of the invention there is provided a method of frequency splitting cells in a cellular telecommunications system, the system having a plurality of cells, and N frequencies, where the N frequencies are divided into K subsets, each of the cells being assigned frequencies from one of the subsets, such that each jth cell is assigned frequencies from the jth frequency subset, the method comprising:

assigning frequencies from at least one nonadjacent cell to at least one part of the cell to form a new cell, while radiating the cell from the same cell site.

In other aspects of the invention, the frequencies are assigned from two non-adjacent cells to two separate parts of the cell; K=9, the cell is the jth cell and it is split into 3 parts and the frequencies of the kth subset are assigned to the ith part where k=(j+3i)mod K for i=0, 1 and 2.

Application of this aspect of the invention requires an appropriate initial frequency distribution which may be obtained by:

assigning a first group of frequencies taken from the available frequencies to a first cell;

for each cell surrounding the first cell, assigning to it a distinct group of frequencies from the first group and from any group assigned to any other cell surrounding the first cell, such that at least a second group of distinct frequencies remains unassigned after each cell surrounding the first cell has been assigned frequencies.

For subsequent cell splitting, the unassigned frequencies may be re-used by assigning the first group of frequencies to a first part of the first cell; and assigning the second group of frequencies to a second part of the first cell, although preferably the cell is split into three parts so that a second and third group of distinct frequencies remain unassigned, after each cell surrounding the first cell has been assigned frequencies, and the third group of frequencies are assigned to a third part of the cell.

Preferably, the first cell is initially center radiated by an omni-directional antenna and after cell splitting the first part of the first cell is end radiated using a directional antenna.

For further cell division, a still further aspect provides a method of splitting cells in a cellular telephone system, having adjacent first and second sets of three co-located end radiated cells, each radiated by directional antennas at first and second cell sites respectively, the method comprising:

locating a third cell site at about the midway point between the first and second cell sites; and radiating at least a third cell from the third cell site.

In one embodiment of this method, the first and second sets of cells are assigned distinct groups of frequencies and the method further comprises:

assigning frequencies to the third cell that are distinct from the frequencies assigned to the first and second sets of cells.

In other embodiments of this method, radiating the third cell comprises end radiating a third set of three co-located cells from the third cell site, and assigning to each of the cells in the third set of cells frequencies that are distinct from the frequencies assigned to the first and second sets of cells.

The inventor also proposes that high antenna sites can be used advantageously for controlling co-channel interference. By high site is meant a site that is higher than all obstructions within the cellular coverage area for that antenna site. For example, an antenna site may be established on the side of a downtown area with a directional antenna directed away from the downtown core. In such a case, the antenna may not be on the highest building in the vicinity but within the cell served by the antenna it may be on the highest building. This is contrary to the teaching in the art which has considered that low sites are preferable for reducing co-channel interference.

As in the case of satellite coverage where the directivity establishes the footprint, the directivity of the antenna and the power of the transmitter should be adjusted to give the appropriate footprint for the cell served by that antenna.

Cells are also preferably interleaved by extending and narrowing the footprints of the directional antennas and filling in the gaps by extending the footprints of adjacent antennas.

In apparatus according to the invention, there is provided an improvement in a cellular telecommunications system having frequency splitting of a subject cell, the subject cell being served by a cell site, the system having a plurality of cells, and N frequencies, where the N frequencies are divided into K distinct subsets, each of the cells being assigned frequencies from one of the subsets, such that each jth cell is assigned frequencies from the jth frequency subset, the improvement comprising:

at least one part of the subject cell having assigned frequencies from at least one non-adjacent cell to form a new cell, the non-adjacent cell having assigned to it a distinct frequency subset from the jth subset, the subject cell being served from the same cell site.

BRIEF DESCRIPTION OF THE FIGURES

There will now be described preferred embodiments of the invention with reference to the accompanying drawings by way of illustration, in which like numerals denote like elements and in which:

FIG. 2 is a table showing the frequency allocation for the prior art K=7 cell, 3 sector, plan;

FIG. 6 is a table showing the frequency allocation for a cellular pattern according to the invention;

DESCRIPTION OF PREFERRED EMBODIMENTS

This description begins with a short set of definitions, then deals with (a) the layout of frequency groups according to the invention, (b) a first stage of cell splitting and (c) a second stage of cell splitting, together with a discussion of interleaving of cells. Finally, a discussion of advantages of the invention is given, with suggestions for the implementation of the invention.

In this patent disclosure, a cell is an area on the surface of the earth that is served by a given antenna. Each cell will be assigned a group of distinct frequencies, and thus the antenna (whether omni-directional or directional) will have its associated filters tuned to those frequencies. Distinct frequencies means frequencies that do not interfere with each other at an unacceptable level, which in the case of frequencies assigned to a specific cell means at least that the frequencies are separated by at least one channel and preferably more, and in the case of frequencies assigned to adjacent cells means the frequencies are at least not the same.

FREQUENCY LAYOUT ACCORDING TO THE INVENTION

Figure 1A:
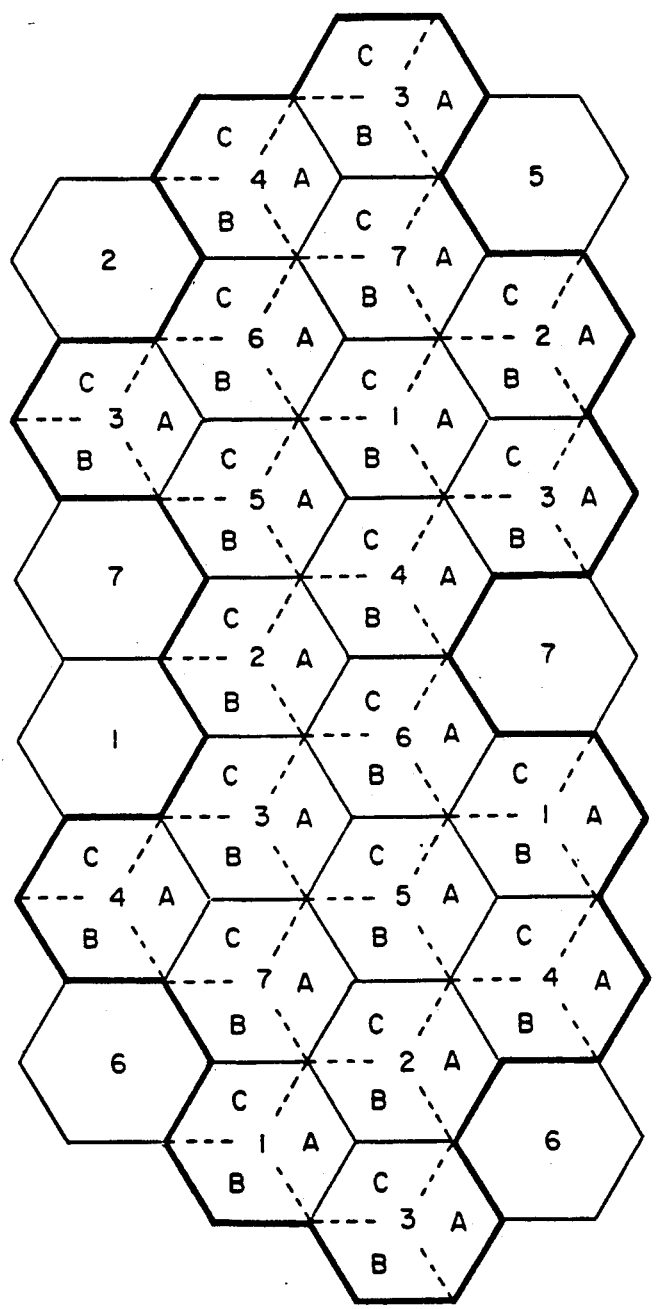
FIG. 1A is a diagram showing the standard prior art cell layout of K=7.
Figure 1B:
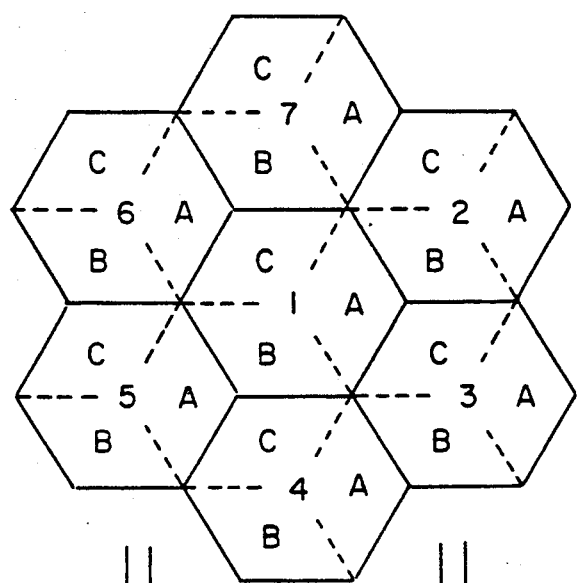
FIG. 1B is a diagram showing 7 co-located sectored cells from the prior art before cell division.
Figure 1C:
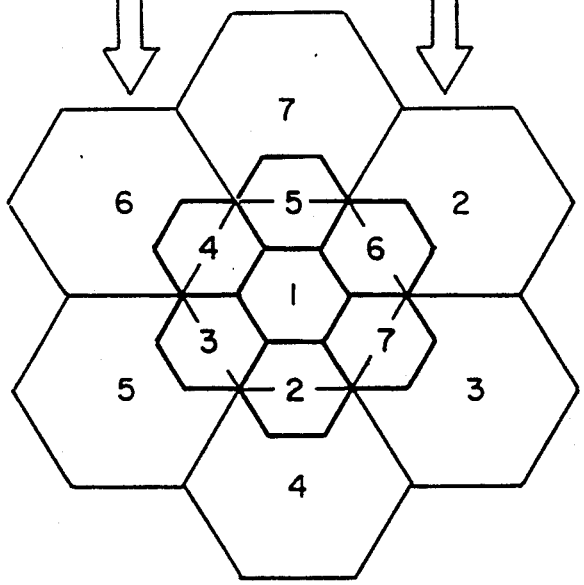
FIG. 1C is a diagram showing the cells of FIG. 1B after cell division.
Figure 3:
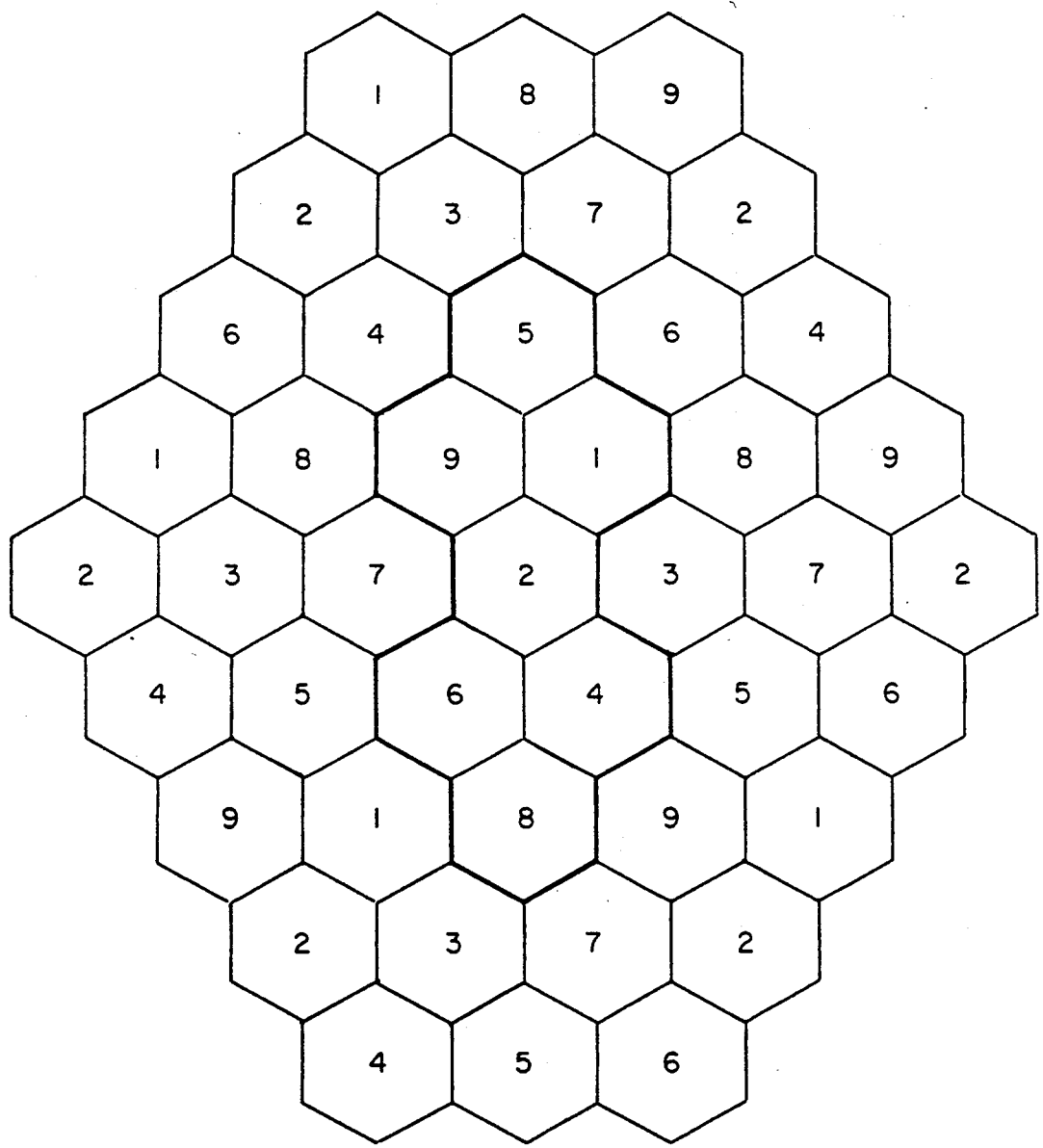
FIG. 3 shows a cellular 9 cell pattern according to the invention.

A preferred embodiment of the initial distribution of frequencies according to the invention is shown in FIG. 3, with a K=9 cell distribution, each cell being center radiated by a single omni-directional antenna. With the 9 cell layout the same frequency sub-groups can be used as with the K=7 layout, only they are distributed differently. Also, this frequency division uses the same control channels as the K=7 pattern. However, the larger groups consist of combinations of different sub-groups. That is, group 1 of the K=7 layout (See FIGS. 1 and 5) consists of 1A, 1B and 1C which corresponds to subgroups 1, 8 and 15 as shown in FIGS. 2 and 6, whereas group 1 of the layout of the present invention would consist of sub-groups 1 and 10. The channel distribution of the N channels between 9 cells in the K=9 pattern for the distribution of channels in the B band (frequencies from 333 to 666) is therefore $\{333 + k + 9j + 21i\}$ for $i=0, 1, 2, \ldots 14$ and $j=0$ and 1, where k is the cell number.

The signalling channels are numbered 334 to 354 inclusive. The base transmit frequency is $(870 + n \times 0.030)$MHz, and the mobile transmit frequency is $(825 + n \times 0.030)$MHz, where n is the channel number, for an allocation of 20MHz per system.

The remaining frequencies are wildcard frequencies that can be used where required, such as in inner city areas with dense mobile telephone traffic. The wildcard groups are groups 19, 20 and 21 of FIG. 6. The channel assignment pattern allows for 30 voice channels per cell. In addition the wildcard groups can be used to increase this number up to 44 channels in selected cells.

The use of the same subgroups and control channels has advantages when K=9 systems need to interface with the conventional systems (K=7). For example, the control channels are compatible and the frequencies are the same in the sub-groups for both systems (that is, where 15 or fewer channels are used).

In the establishment of the system using omni-directional cells, the available frequencies (presently 333) are assigned to the cells by choosing a first cell, assigning to it a first group of frequencies (for example, those belonging to group K =1), and then assigning the surrounding adjacent cells distinct groups of frequencies but leaving out the groups of frequencies (re-use frequencies) that are to be used later during cell splitting. This seeming inefficient use of frequencies results in benefits during cell splitting. As shown in FIG. 3, frequencies of the 1st group are assigned to the cell labelled 1, and then one of the adjacent surrounding cells is assigned frequencies from the second group (cell 2). This process continues for each surrounding cell, but leaving out the frequencies that are to be used later for cell splitting, which are preferably those that minimize co-channel interference. Thus, in FIG. 3, groups 4 and 7 are not assigned to cells adjacent cell 1, groups 5 and 8 are not assigned to cells adjacent cell 2 and groups 6 and 9 are not assigned to cells adjacent cell 3.

This layout is made with clusters of 3 co-located cells, and with K=9 distinct groups of frequencies, the cluster re-use frequency is 9/3=3. The system may also work with a cluster re-use frequency of 4, hence K=12. In this case, the cells surrounding the first cell may be assigned frequency groups 2, 3, 4, 6, 7 and 8, leaving out groups 5 and 9 for later re-use. The frequencies assigned to each of these groups is made on the same principles as used to establish the frequency groups shown in FIG. 6.

Thus, the available frequencies are assigned to a plurality of cells in a telephone system, each of the cells being distributed in three cell clusters, by:

(a) defining a set of re-use frequencies;
(b) selecting a first cell and assigning to it a first group of frequencies that are distinct from the re-use frequencies;
(c) selecting a cell adjacent to the first cell and assigning to it a group of frequencies that is distinct from each of the first group, any group of frequencies assigned to a cell surrounding the first cell and the re-use frequencies;
(d) repeating step (c) until each cell adjacent to the first cell has a distinct group of frequencies assigned to it; and
(e) assigning the re-use frequencies to a cell that is separated from the first cell by one cell.

Figure 8:
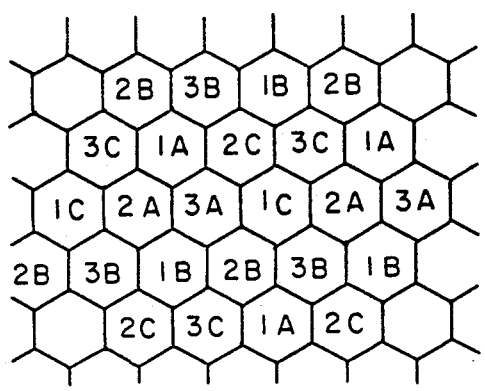
FIG. 8 is a diagram showing frequency assignment for both K=9 and K=12.
Figure 8:
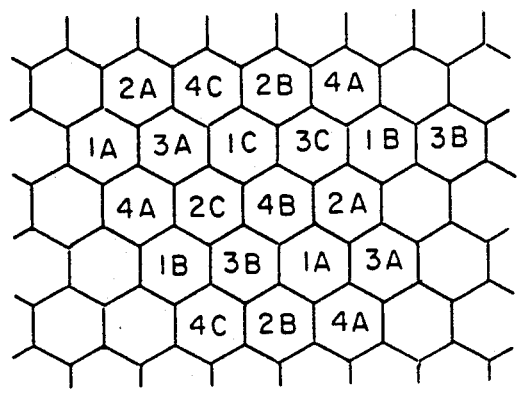
Figure 8:
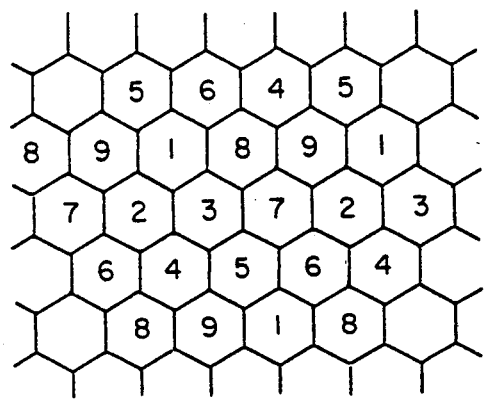
Figure 8:
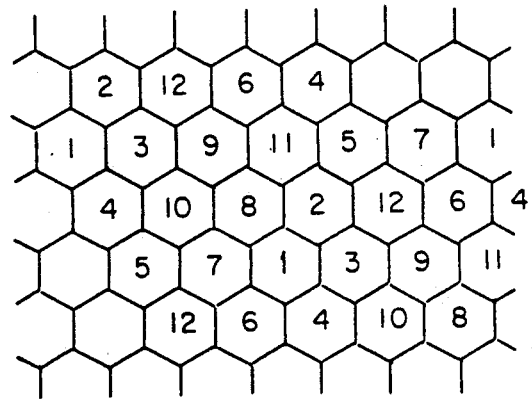

This method is applied to all of the cells in the system, resulting, in the case of $K=9$, in the assignments shown in FIG. 3 and, in the case of $K=12$, in the assignments shown in FIG. 8.

Figure 4:
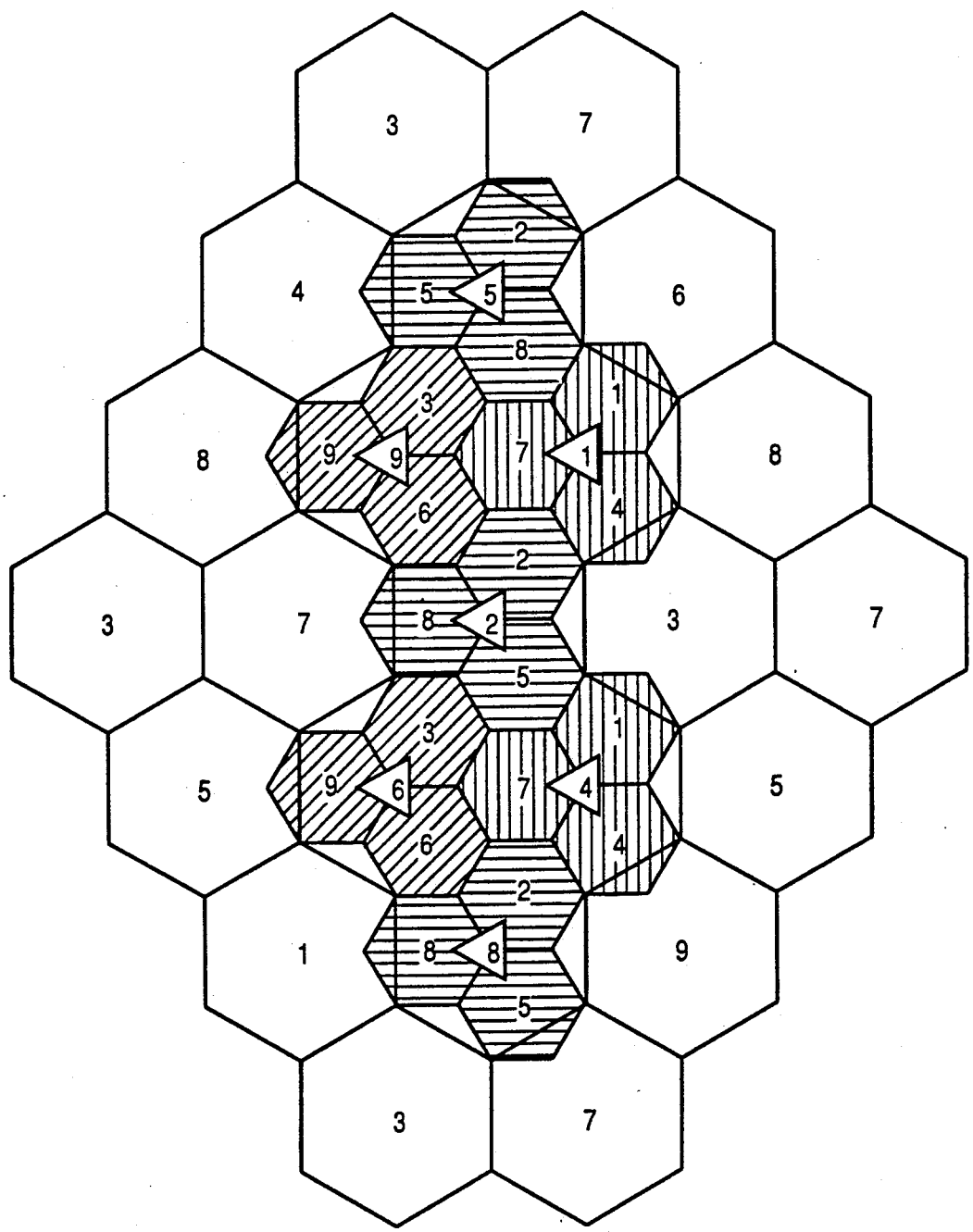
FIG. 4 is a diagram showing an application of an embodiment of a method according to the invention showing the conversion of omni-directional cells to end-radiated cells.

If the re-use frequencies for a particular cell k are designated by letters A, B and C, and the groups then identified by the letters kA, kB and kC, for $k=1$, 2 and 3 (FIG. 3 and 8) or $k=1, 2, 3$ and 4 (FIG. 8 for the case $m=4$), then the frequencies are distributed such that any group of cells kA, kB and kC forms an equilateral triangle, with a cell having a distinct group of frequencies between any pair of cells kA and kB, kB and kC, and kA and kC. The complete cell distribution is thus formed by leaving out the re-use frequencies (for cell kA these are kB and kC) in the cells adjacent kA, and then assigning the re-use frequencies to non-adjacent cells. When the cells are later sub-divided, and directional antennas used, the equilateral distribution of the cells with re-use frequencies permits the antennas in cells with the same frequencies to be separated by the maximum uniform distance. This may be seen in FIGS. 3, 4 and 8. As seen in FIG. 4, the orientation of the directional antennas in the smaller cells results in there being 7 hexagonal cell radii between co-channel cells in the direction of orientation of the antenna. That is, a random pattern may result in greater distance between some co-channel cells, but others will be closer together.

In this manner, the cells adjacent to any particular cell are assigned frequencies that are separated from the frequencies assigned to that particular cell by at least one channel. At least two of the cells that are separated by one cell from any particular cell are assigned frequencies that differ from the frequencies assigned to the particular cell by at least three channels, resulting in a reduction of interference.

FIRST STAGE OF CELL SPLITTING

The first stage of cell splitting using an embodiment of the method of the present invention is shown in FIG. 4, where the same cell group as outlined in FIG. 3 is shown in heavy outline. The initial large cells with circles marking omni-directional antennas are shown numbered as cells 1-9, having effective hexagonal radii R approximately equal to 12 Km. This is similar to $K=7$ start except for frequency groupings (see FIG. 6, Subgroups 1 and 10, 2 and 11, etc.)

As capacity needs to be increased, additional directional cells are provided where needed as shown in FIG. 4. In FIG. 4, the cells without hatching, identified by the numerals in circles, are the larger (omni-directional) cells before splitting, while the smaller cells with hatching are the cells after splitting. Each of the smaller cells is preferably end radiated using a set of three co-located directional antennas. The direction of the maximum radiation from the antenna (referred to as the orientation of the antenna) is indicated for each antenna by the apex of the triangle.

Each larger cell is split by assigning to a part of it frequencies of a non-adjacent cell, so that after the split some of the cell is assigned the original group of frequencies and at least one part of the cell is assigned frequencies from a non-adjacent cell to form a new cell, while maintaining coverage of the cell from the same, or essentially the same cell site. Preferably, the non-adjacent cells from which the frequency assignments are derived are separated from the cell being split by at least two intervening cells of the size of cell after splitting, and where $K=9$, the cell is preferably split into 3 parts.

In the example shown, cell 2 is divided into parts or cells having assigned to them frequencies from the 2, 5 and 8 cells. These cells (5 and 8) are the only two cells that do not abut the 2 cell before splitting, hence providing for a minimum cell separation of two intervening cells of the size of cell after cell splitting.

In the general case, the cell is the jth cell and it is split into m parts, and the frequencies of the kth subset are assigned to the ith part by the formula: $k=(j+3i) \bmod K$ for $i=0$, 1 and 2. For a hexagonal grid system, with 6 cells surrounding any one cell, it is believed that optimal frequency assignment may be obtained by using a frequency repeat pattern based on $K=9$.

With increasing telephone traffic, typically in the inner city, further cell splitting may become necessary. In that case, new cells may be provided at the corners of the inner cells, as described in more detail in the next section.

SECOND STAGE OF CELL SPLITTING

If additional cell divisions are necessary, this can be accomplished with an embodiment of the method of the present invention by adding the new site about midway between 2 existing sites and using the cell number not in use at either of the existing sites.

Figure 5:
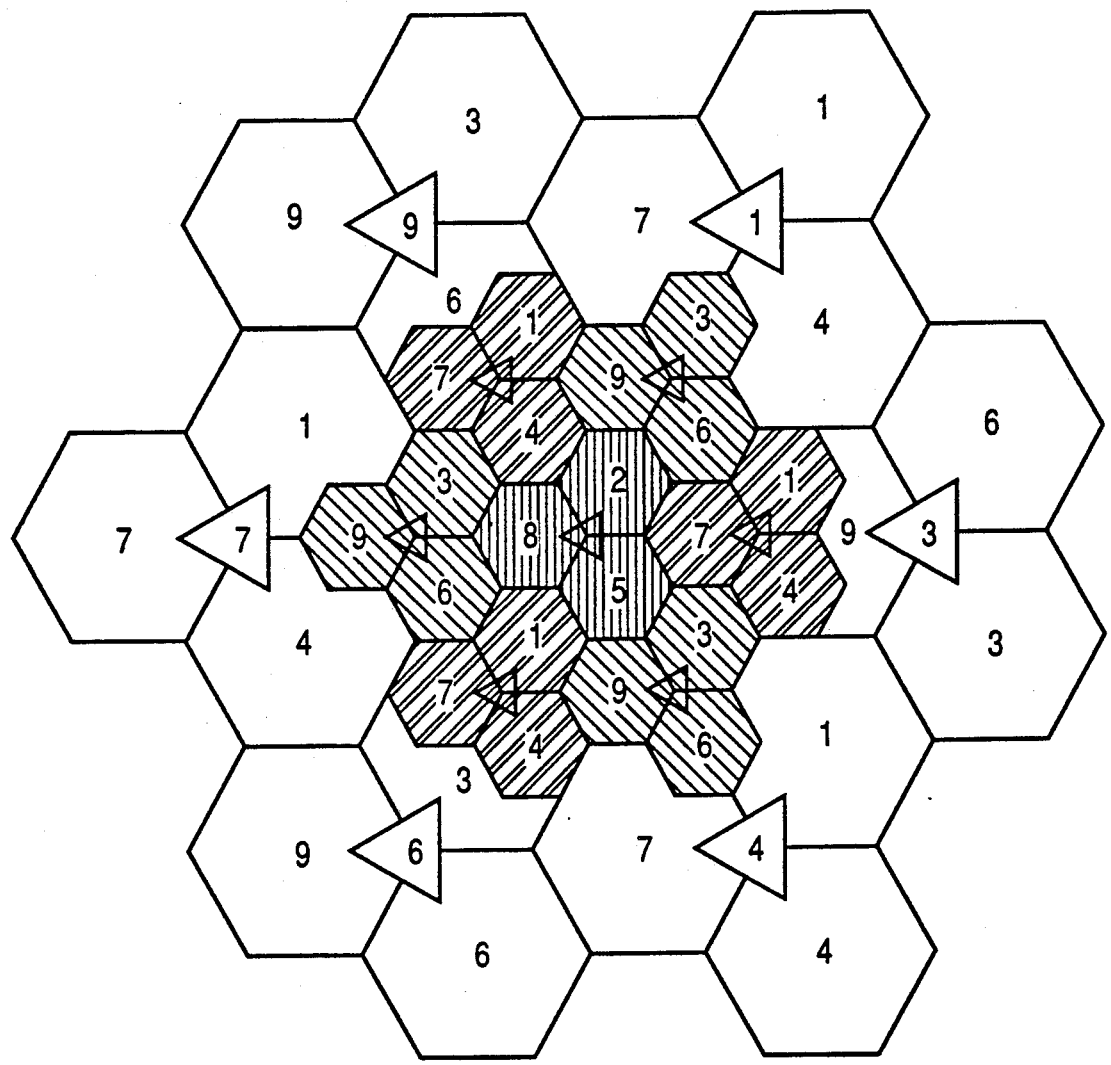
FIG. 5 is a diagram of a second application of an embodiment of a method according to the invention showing the splitting of end-radiated cells.

That is, if a cell site is to be added between a first cell site with cells 1, 4, and 7, and a second cell site with cells 2, 5, and 8 then the new site will contain cells 3, 6, and 9, as shown in FIG. 5.

The groups of cells 1, 4 and 7 and 2, 5 and 8 are the first and second sets of three co-located end radiated cells, each radiated by directional antennas at first and second cell sites respectively. The cell splitting method is then to locate a third cell site at about the mid-way point between the first and second cell sites; and to radiate at least a third cell from the third cell site.

According to the $K=9$ cell distribution, the first and second sets of cells are assigned distinct groups of frequencies (1, 4, 7, 2, 5 and 8) and in the method of cell division frequencies are assigned to the third cell that are distinct from the frequencies assigned to the first and second sets of cells (3, 6 and 9).

In this method, it is preferable that directional antennas are used at the third cell site to end radiate a third set of three co-located cells.

It is also preferable that the assigning of frequencies is done by assigning to each of the cells in the third set of cells frequencies that are distinct from the frequencies assigned to the first and second sets of cells.

In a cellular system based on the hexagonal cell distribution, each cell will be surrounded by 6 cells, so that the K=9 distribution will always yield 2 cells that are non-adjacent the center cell and which have distinct frequency assignments. In the general case, if the cell is sub-divided into m different parts then each cell must be surrounded by no more than K−m cells. This yields at least m−1 non-adjacent cells from which frequency subsets can be taken for cell splitting.

INTERLEAVING OF CELLS

In the first stage of cell division best illustrated in FIG. 4, when the directional antennas are introduced, the smaller cell extends the boundaries of the old omni-directional cell. This extension of the cell, or equivalently, extension of the footprint of the directional antenna, requires the directional antenna to have a narrower footprint than the directional antennas used in the conventional cell distribution illustrated in FIG. A narrower footprint, as is well known in the art, may be obtained by increasing the horizontal directivity of the antenna.

The edge of a footprint is normally defined in relation to adjacent cells since the footprint of an antenna is the area where the signal of that antenna is the predominant signal. Because handoff algorithms assign a mobile customer the dominant frequency receivable by that customer, the footprint of an antenna is defined as the area where that antenna will be the one used by a mobile customer. Otherwise, the edge of the footprint may be defined in terms of the signal level, for example, where the signal level coverage is at the 39 dB microvolt contour.

The extension of the footprints formed by adjacent first and second antennas at a first cell site results in a gap, and the extension of the footprint of an antenna of an adjacent cell site into the gap results in the interleaving of the footprints. Thus, for example, the footprint of the smaller 2 cell in the center of FIG. 4, extends between and interleaves with the footprints of the small adjacent 4 and 7 cells. With a 60 degree antenna that is 10 dB down at the side of the footprint, this provides for a more distinct handoff than is available from the sectorization system shown in FIG. 1.

In addition, in the case where a customer is moving around the edge of a group of co-located cells, for example, small cells 2 and 8 in the center of FIG. 4, handoff to the adjacent cell 6 will occur. Although this results in an increase in the number of handoffs, the handoff is more distinct. Also the number of handoffs is compensated for by a decrease in the total number of handoffs required in the system.

In the preferred implementation of the invention, handoff (which requires extensive control equipment, all readily commercialy available) may be controlled by the mobile telecommunications switching office rather than, as commonly used, the cell site.

Figure 7:
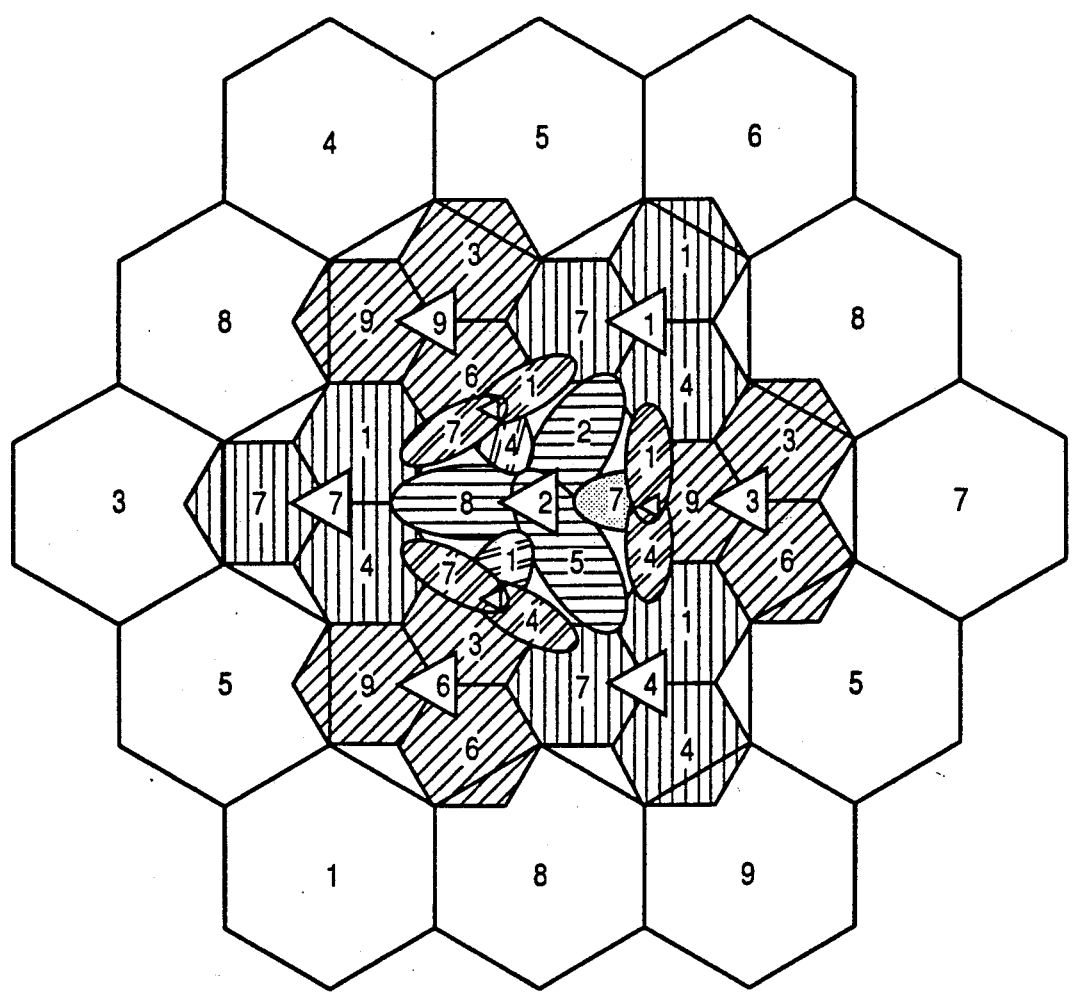
FIG. 7 is a diagram of a cellular system showing interleaving of cells.

In FIG. 7, the interleaving is made more apparent by the replacement of the idealized hexagonal cells by approximations of the actual footprints. As shown in FIG. 7, interleaving of cells may also be introduced before the second stage of cell splitting where appropriate as a method of filling in frequency assignments. In FIG. 7, the interleaved cells are the densely hatched cells surrounding the 2 cell site with the three end radiated 2, 5 and 8 cells. This assignment is facilitated by making available frequencies to be assigned to the new interleaved cells.

The use of highly directional antennas with narrow footprints diminishes interference from laterally spaced cells but increases it from cells in the direction of orientation of the antenna. Thus, it is desirable, as with the methods described here to have similar channels significantly separated in the antenna orientation direction.

Various types of antennas may be used to implement the present invention. A KATHREIN antenna model no. A 633061 with a vertical beamwidth of 19 degrees may be used, or a DECIBEL DB 874 antenna with vertical beamwidth of 14 degrees. These antennas are readily commercially available with various horizontal beamwidths, and mechanical tilting is available on the Decibel products.

ADVANTAGES OF THE INVENTION AND PRACTICAL CONSIDERATIONS OF THE IMPLEMENTATION OF THE INVENTION

Some practical considerations arising from the implementation of the method of the invention are as follows. As shown in FIG. 4, 3 cells are end radiated from one cell site. Consider cells designated by k=2, 5 and 8. These cells would be served with directional antennas oriented at 30 degrees, 150 degrees and 270 degrees. As one desires to cover the cell, the gain of the antenna should be high (i.e. +16 dB at 0 degrees, +13 dB at plus and minus 30 degrees, and +6 dB at plus and minus 60 degrees).

For maximum cell site utilization 3 cells are co-located, however due to topography or building blockage, cells can be separated into stand alone directional cells, without violating the cellular pattern. The back lobe radiation will usually allow sufficient radiation behind the antenna (fill in) for separations up to $\frac{1}{4}$ R, where R is the radius of the hexagonal cell (also equal to the length of one side of the hexagon).

The 9 cell re-use pattern allows for 29 voice channels per cell with up to an additional 14 more voice channels per cell for congested areas. With this pattern, using the wildcards, and once in every 9 cell re-use, higher traffic capacity from 7 sites is obtainable than for 21 sites using the sectored K=7 pattern.

To maintain minimum co-channel interference, the base station antennas and power should be selected to provide the required decrease in signal level in areas where interference could be expected. Greater uniformity of signal strength within a cell may be obtained with antennas at high heights as the point of reflection from the ground (or other obstacles) increases directly with antenna height.

The use of high sites is also facilitated with the invention. If, for example, an omni-directional antenna is located at a cell site on one side of a hill and it is desired to replace it with a set of three co-located directional antennas, then two of the directional antennas may be located at the cell site, and a third located nearer the top of the hill, using the back lobe of the antenna radiation pattern to fill in the intervening area.

In the initial stages of cellular development, high gain omni-directional antennas are used. In FIG. 3, the apex of the cell is vertical. However, when directionally radiated cells are introduced the apex becomes horizontal. This change allows for 3 times the number of cells using the same site and no change in frequency allocations. This change allows the system to change from N cells to 3N cells, with the corresponding 3 fold increase in capacity. The next stage would be by cell division as shown in FIG. 5. This creates a four fold increase in cells to 12N cells.

The cell distribution of the present invention (FIG. 4) is compared with the conventional K=7 pattern (FIG. 1) as follows. In each case, there are 21 equal sized cells. The wildcard groups are distributed over cells 2, 5 and 9. The wildcard groups are sub-groups 19, 20 and 21 from FIG. 6, indicated in the figure by the notation WC.

|  | Present invention | Conventional |
| --- | --- | --- |
| Area Covered | 21 Cells | 21 Cells |
| Sites | 7 | 21 |
| Sectors or Cells | 21 Cells | 63 Sectors |
| No. of Voice Channels | 8 Cells @ 44 vc = 352 | 63 Sectors @ 14 vc |
|  | 13 Cells @ 29 vc = 377 |  |
|  | Total = 729 | Total = 882 |
| Traffic Capacity | 8 @ 34.7 E | 63 @ 8.2 E |
|  | 13 @ 21 E | (Note 1) |
| Total | 550.6 Erlangs | 516.6 E |

Based on the above the cost is expected to be more than 50% less for the present invention over the conventional system because of fewer sites, higher trunking efficiencies and fewer control channels. (Note 1: Taken from Traffic Tables given on P 34 & P 35 of the book *Mobile Cellular Telecommunications Systems* for 2% blocked calls during busy hour.)

Handoff occurs when a mobile traverses from 1 cell to another, or from 1 cell sector to another. The total number of handoffs is expected to be more than twice as high on the K=7 pattern. This excessive handoff makes handoff between sectors of the same site necessary for the conventional system, but not for the present invention.

The K=7 Pattern requires 120 degree antennas whereas the present invention requires 60 degree antennas. The 60 degree antenna will provide additional co-channel interference protection. Both systems require careful selection of sites and the use of antenna tilt to ensure maximum co-channel interference protection. Co-channel interference is expected to be similar between the two systems.

Since both systems do not use adjacent channels from the same site, the adjacent channel interference will be negligible.

The present invention allows for more flexibility as each cell can stand alone. This would allow all three co-located cells to be separated when necessary. The transition from omni-directional large cells to small directional cells can evolve smoothly as there is not the jump down in trunking efficiency when directional cells are introduced. Contrasted to the present invention, the K=7 conventional pattern cell division is required because sectorization results in approximately 30% reduction in trunking efficiency when changing from a 44 voice channel (vc) omni-directional cell to a 14 vc sectored cell.

Having 3 groups of frequency available for wildcard usage is beneficial, since additional channels are required in selected cells to accommodate the large fluctuations in traffic density from the city core to urban areas. The ability of being able to provide up to an additional 28 channels at a site would result in significant savings when providing a cellular system.

The following are advantages that arise when the present invention is adopted over the conventional K=7 system.

Trunking Efficiency: the trunking efficiency does not decrease when directional cells are introduced, as the cells are changed from a number of R=12 Km omni cells to 3 times the number of R=6 Km directional cells without adding sites.

Fewer cell sites: as shown above the conventional pattern (K=7) has up to 3 times the number of cell sites as the present invention. Few handoffs: each directional cell covers 3 times the area of a 7×3 sector and thus less than one third of the handoffs would be expected on the present invention.

Lower facility cost: in addition to fewer voice and control channels (approx. 30% less), if serviced with private microwave or fibre services, the cost of going to fewer sites would be up to 70% less, than going to sectored cells. (Note: this does not apply to rural sites as traffic does not dictate 3 directional cells per site).

Flexibility is increased by the availability of non-assigned wildcard sub-groups. Normally the highest traffic density would be in the city core and therefore additional channels would be assigned to these cells, however as long as co-channel and adjacent channel protection is maintained, these wildcard frequencies can be assigned to other congested areas.

Co-located cells: as handoff is significantly less with the present approach, the need for intersite handoff (from control at site) is unnecessary. Without this handoff limitation the 3 co-located cells could be separated. This type of separation would occur when the topography prevents serving three areas from one site.

Evolution from centre to end radiated cells: This is effected by observing that the centre radiated cell (see FIG. 3) can provide 3 end radiated cells from each site if we change from a vertical to a horizontal pattern. (A vertical pattern refers to the position of the apex of the cell). If we start with the cell radius equal to 12 Km in FIG. 3 then the cell radius of these new cells will be 6 Km. The next cell division will give the small 3 Km cells. It should be noted that this rotation of patterns would also be valid for other cell orientations (i.e. A horizontal pattern for omni cells would change to a vertical pattern on the end radiated cells).

Preferred examples of the invention have been described, but the invention includes all immaterial variations on the embodiments disclosed. The invention has been described with reference to the existing systems in use in North America, but is believed to have applicability to any cellular system in which frequency re-use is required, including digital implementations of the system.

I claim:

1. A method of assigning K groups of available frequencies, the groups being numbered in order from $k=1, 2, \ldots K$, each of the frequencies of the kth group differing from the respective frequencies of the kth+1 group by one channel, to a plurality of cells in an initial hexagonal pattern in a cellular telecommunications system, the method comprising:

(a) assigning a first group of frequencies taken from the available frequencies to a first cell;

(b) for each cell adjacent to the first cell, assigning to it a distinct group of frequencies from the first group and from any group assigned to any other cell adjacent to the first cell, such that at least a second group and a third group of distinct frequencies remains unassigned after each cell adjacent to the first cell has been assigned frequencies;

(c) assigning frequencies from the second group to each of three second cells that are non-adjacent to the first cell and that are adjacent to a cell adjacent to the first cell, the three second cells being spaced substantially equally from each other about the first cell; and (d) assigning frequencies from the third group to each of three third cells that are non-adjacent to the first cell and that are adjacent to a cell adjacent to the first cell, the three third cells being spaced substantially equally from each other about the first cell and the second cells; and the respective frequencies of the first, second and third groups of frequencies differing from each other by at least three channels.

2. The method of claim 1 further including:
re-assigning the first group of frequencies to a first part of the first cell;
assigning the second group of frequencies to a second part of the first cell; and
assigning the third group of frequencies to a third part of the cell, such that the first, second and third parts of the cell substantially cover the cell.

3. The method of claim 1 in which steps (a), (b), (c) and (d) are applied to determine the frequency assignment for each cell in the cellular telephone system.

4. The method of claim 2 in which the first cell is initially center radiated by an omni-directional antenna and further including end radiating the first, second and third parts of the first cell from the same cell site using a plurality of directional antennas after assigning the first, second and third groups of frequencies to the first cell.

5. The method of claim 1 in which $K=9$ and the frequencies of the first, second and third groups are separated from each other respectively by three channel.

6. The method of claim 1 in which $K=12$ and the frequencies of the first, second and third groups are separated from each other respectively by three channels.

7. The method of claim 2 in which the boundaries between adjacent cells in the initial hexagonal pattern define a first set of axes and in which the boundaries between the respective first, second and third parts of the first cell define a second set of axes, the first set of axes being oriented at 30 degrees to the second set of axes.

8. The method of claim 4 in which the boundaries between adjacent cells in the initial hexagonal pattern define a first set of axes and in which each of the plurality of directional antennas is aligned at 30 degrees to the first set of axes.

9. The method of claim 8 further including adjusting the horizontal directivity of at least one of the plurality of directional antennas to extend its footprint beyond the boundaries of the subject cell.

10. The method of claim 8 further including extending the footprint of an antenna in an adjacent cell between the footprints of two of the plurality of directional antennas.

11. A cell layout in a cellular telecommunications system in which there are K groups of frequencies in order from $k=1, 2, \ldots K$, each of the frequencies of the kth group differing from the respective frequencies of the kth+1 group by one channel, the layout comprising:

a first cell having assigned to it a first group of frequencies;

six adjacent cells distributed in a hexagonal pattern about the first cell having assigned of them a plurality of groups of frequencies;

three second cells distributed regularly about the six adjacent cells so that their centers form an equilateral triangle with the first cell in the center of the equilateral triangle, the three second cells having assigned to them a second group of frequencies that are different from the plurality of groups of frequencies and the first group of frequencies;

three third cells distributed regularly about the six adjacent cells so that their centers form an equilateral triangle with the first cell in the center of the equilateral triangle, the three third cells having assigned to them a third group of frequencies that are different from the plurality of groups of frequencies and the first and second groups of frequencies, and being located between respective pairs of the second cells; and the frequencies of the first, second and third groups of frequencies differing from each other respectively by at least three channels.

12. The cell layout of claim 11 in which $K=9$.

13. The cell layout of claim 11 in which $K=12$.

14. The cell layout of claim 11 in which the first cell is further sub-divided into three parts and two of the parts are assigned frequencies from the second and third groups of frequencies.

15. The cell layout of claim 14 in which the parts of the first cell are each end radiated by a directional antenna and at least one other cell is radiated by an omni-directional antenna.

16. The cell layout of claim 15 in which the orientation of the directional antennas are offset by 30 degrees from the axes defined by the boundaries between adjacent non-sub-divided cells.

17. A cell layout for a cellular telecommunications system having a hexagonal pattern of cells and having available a set of at least $K=9$ groups of distinct frequencies, in order from $k=1, 2, \ldots K$, each of the frequencies of the kth group differing from the respective frequencies of the kth+1 group by one channel, the cell layout comprising:

a first cell having assigned to it the $K=1$ group of frequencies;

adjacent cells to the first cell having assigned to them respectively in order around the first cell the $K=2, 3, 8, 6, 5$ and 9 groups of frequencies;

a first set of three equally spaced cells adjacent to and located around the adjacent cells each of the first set of three equally spaced cells having assigned to them the $K=4$ groups of frequencies; and a second set of three equally spaced cells adjacent to and located around the adjacent cells and equally spaced between respective ones of the first set of three equally spaced cells, each of the second set of three equally spaced cells having assigned to them the $K=7$ group of frequencies.

18. The cell layout of claim 17 in which the intervening cells between the second and third sets of equally spaced cells are assigned in order the $K=2, 3, 8, 6, 5$ and 9 groups of frequencies such that the distance between a cell in the intervening cells and a cell in the adjacent cells having the same frequency assignment is a maximum.

* * * * *